US009125045B2

(12) United States Patent
Chetlur et al.

(10) Patent No.: US 9,125,045 B2
(45) Date of Patent: Sep. 1, 2015

(54) DELAYED DATA DELIVERY OPTIONS

(71) Applicant: International Business Machines Corporation, Armonk, NY (US)

(72) Inventors: Malolan Chetlur, Bangalore (IN); Parul Gupta, Bangalore (IN); Shivkumar Kalyanaraman, Bangalore (IN); Ravindranath Kokku, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 159 days.

(21) Appl. No.: 13/689,896

(22) Filed: Nov. 30, 2012

(65) Prior Publication Data

US 2014/0155024 A1    Jun. 5, 2014

(51) Int. Cl.
*H04M 11/00*    (2006.01)
*H04W 4/26*    (2009.01)
*H04W 72/12*    (2009.01)

(52) U.S. Cl.
CPC ............ *H04W 4/26* (2013.01); *H04W 72/1247* (2013.01)

(58) Field of Classification Search
None
See application file for complete search history.

(56) References Cited

U.S. PATENT DOCUMENTS

| 7,398,080 | B2 | 7/2008 | Phyalammi et al. |
| 7,505,731 | B2 | 3/2009 | Aaltonen et al. |
| 2002/0143952 | A1* | 10/2002 | Sugiarto et al. ............... 709/227 |
| 2002/0144276 | A1 | 10/2002 | Radford et al. |
| 2004/0180677 | A1* | 9/2004 | Harris et al. .................. 455/466 |
| 2005/0273514 | A1 | 12/2005 | Milkey et al. |
| 2006/0294561 | A1 | 12/2006 | Grannan et al. |
| 2008/0192820 | A1 | 8/2008 | Brooks et al. |
| 2011/0055413 | A1* | 3/2011 | Lobsenz ....................... 709/231 |
| 2011/0314145 | A1* | 12/2011 | Raleigh et al. ............... 709/224 |
| 2012/0203616 | A1* | 8/2012 | Lobsenz ..................... 705/14.27 |
| 2013/0031279 | A1* | 1/2013 | Venugopal et al. ............. 710/18 |

OTHER PUBLICATIONS

Liu, Yanni Ellen et al., "A Delay Pricing Scheme for Real-Time Delivery in Deadline-Based Networks," Proceedings of WINE, Abstract Only, 2005, 1 page, CiteSeer, available at http://citeseerx.ist.psu.edu/viewdoc/summary?doi=10.1.1.89.8289 as of Jan. 21, 2012.

* cited by examiner

*Primary Examiner* — Suhail Khan
(74) *Attorney, Agent, or Firm* — Ference & Associates LLC

(57) ABSTRACT

Systems and methods for effecting delayed delivery of data. There are received, at a scheduler, from a plurality of mobile computing devices, a plurality of requests for transmission of data objects. Responsive to the requests, communication is made to at least one of the devices at least one offer for a delayed transmission deadline of at least one data object. There is received, at the scheduler, at least one response to the at least one offer, and there is determined a scheduling priority of transmissions based on the at least one response.

17 Claims, 6 Drawing Sheets

DELAYED DATA DELIVERY OPTIONS

BACKGROUND

Delivery of digital content to mobile devices over the 3G spectrum carries costs for mobile network operators, over-the-top-providers, and end users. Mobile network operators provide bandwidth for delivery of data services.

During peak times, such bandwidth may be depleted, thereby causing unintended delays in delivery and decreasing the user's quality of experience. Such delays also erode the user's quality of experience for over-the-top programming, thus eroding the user's confidence in the mobile network operator and the over-top-provider's services. Moreover, during off-peak demand times, bandwidth may go unused, and typically there is no way to recover the unused bandwidth for future use. Thus, the lost bandwidth decreases the total profits of the mobile network provider.

In view of these considerations and others, it has become readily apparent that conventional systems and methods have fallen short in providing a desirably efficient use of 3G spectrum bandwidth.

BRIEF SUMMARY

In summary, one aspect of the invention provides a method of effecting delayed delivery of data, the method comprising the steps of: utilizing a processor to execute computer code configured to perform the steps of: receiving at a scheduler, from a plurality of mobile computing devices, a plurality of requests for transmission of data objects; responsive to the requests, communicating to at least one of the devices at least one offer for a delayed transmission deadline of at least one data object; receiving, at the scheduler, at least one response to the at least one offer; and determining a scheduling priority of transmissions based on the at least one response.

Another aspect of the invention provides an apparatus comprising: at least one processor; and a computer readable storage medium having computer readable program code embodied therewith and executable by the at least one processor, the computer readable program code comprising: computer readable program code configured to receive at a scheduler, from a plurality of mobile computing devices, a plurality of requests for transmission of data objects; and computer readable program code configured to communicate, responsive to the requests, communicating to at least one of the devices at least one offer for a delayed transmission deadline of at least one data object; computer readable program code configured to communicate to at least one of the devices, responsive to the requests, at least one offer for a delayed transmission deadline of at least one data object; computer readable program code configured to receive, at the scheduler, at least one response to the at least one offer; and computer readable program code configured to determine a scheduling priority of transmissions based on the at least one response.

An additional aspect of the invention provides a computer program product comprising: a computer readable storage medium having computer readable program code embodied therewith, the computer readable program code comprising: computer readable program code configured to receive at a scheduler, from a plurality of mobile computing devices, a plurality of requests for transmission of data objects; and computer readable program code configured to communicate, responsive to the requests, communicating to at least one of the devices at least one offer for a delayed transmission deadline of at least one data object; computer readable program code configured to communicate to at least one of the devices, responsive to the requests, at least one offer for a delayed transmission deadline of at least one data object; computer readable program code configured to receive, at the scheduler, at least one response to the at least one offer; and computer readable program code configured to determine a scheduling priority of transmissions based on the at least one response.

A further aspect of the invention provides a method comprising: receiving a plurality of requests for transmission of data objects in a communications network; responsive to the requests, communicating at least one offer for a delayed transmission deadline of at least one data object; receiving at least one response to the at least one offer; determining a scheduling priority of transmissions based on the at least one response; and reconciling the determined scheduling priority on an ad-hoc basis with respect to an available network capacity.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
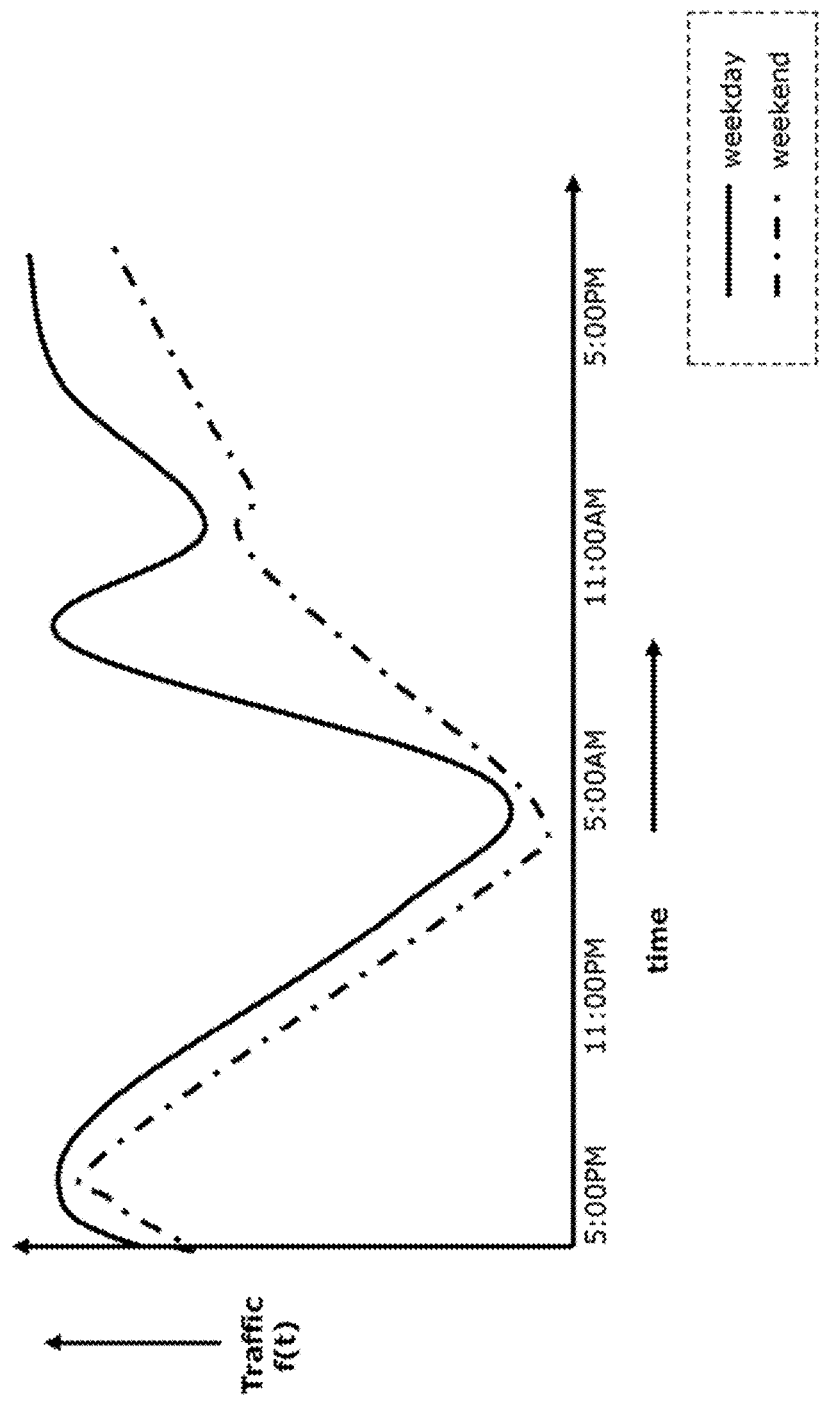
FIG. 1 illustrates graph of peak and off-peak delivery demands.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are described to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention. This disclosure will now begin with a general description of embodiments and then turn to specific non-liming examples of embodiments with reference to the drawings herein.

Embodiments generally provide offering mobile device users delayed delivery times in order to spread out bandwidth usage on 3G networks. Some embodiments provide that users who subscribe to lower data usage ceilings who request delivery of data objects such as videos may be prompted to accept delayed delivery or offered delivery without counting against their current data plan usage allowances. Still other embodiments provide that mobile device users on 3G networks might be prompted to temporarily increase their data usage plan allowance for an extra charge above their usual data allowance plan charges.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will now be made hereinbelow to FIGS. 1-4. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 6. In accordance with an example embodiment, most if not all of the process steps, components and outputs discussed with respect to FIGS. 1-4 can be performed or utilized by way of a processing unit or units and system memory such as those indicated, respectively, at 16' and 28' in FIG. 6, whether on a server computer, a client computer, a node computer in a distributed network, or any combination thereof.

As discussed above, bandwidth usage due to user requests will have both peaks and valleys. During peak times, content delivery may be slowed or delayed unintentionally. During off-peak times, bandwidth may be wasted with no reliable way available to recover the resources. As shown in FIG. 1, an example graph of weekend and weekday usage illustrates peaks and valleys in the usage. Embodiments describe that by offering users delayed delivery of content the peaks and valleys can be smoothed out to allow the best utilization of bandwidth, thus decreasing unintended delays and increasing the users quality of experience (QoE).

Figure 2:
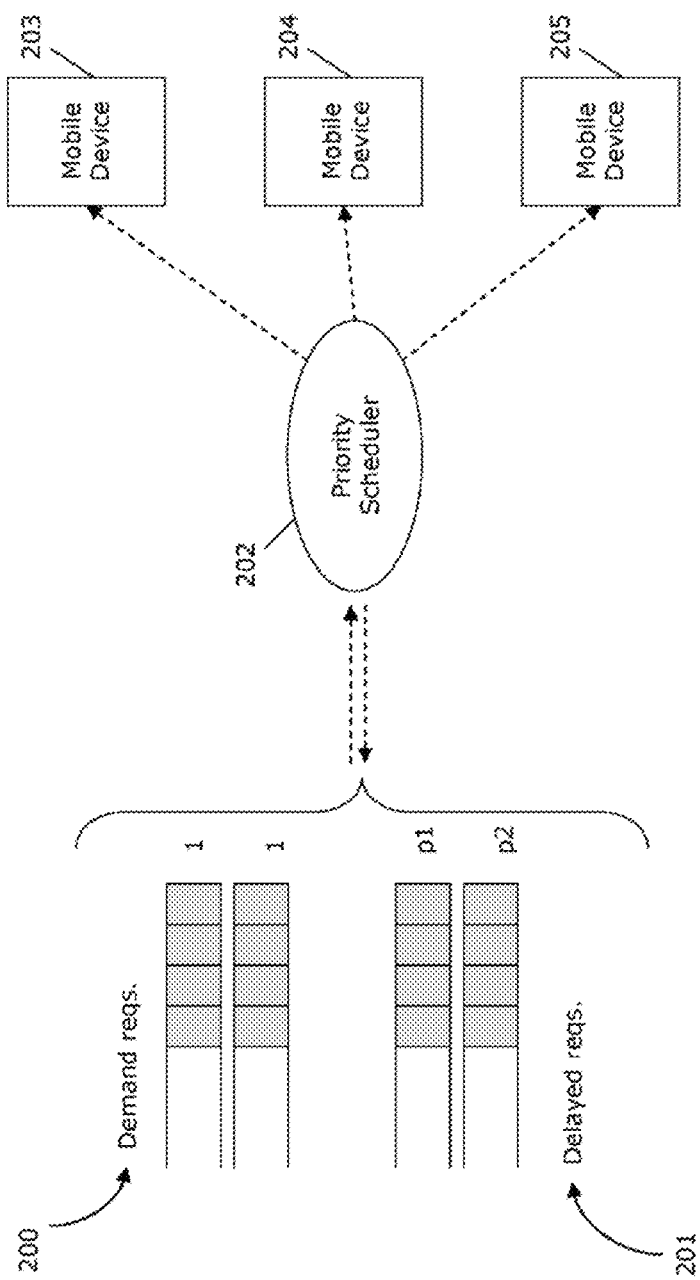
FIG. 2 illustrates an example embodiment.

Now turning to FIG. 2, an example embodiment is illustrated. In this non-limiting example, users of mobile devices (203, 204, and 205) are each offered delayed delivery options in return for reduced pricing compared to immediate on-demand delivery. As such, user requests for mobile content data delivery (also referred to as data objects) (200 and 201) for the mobile devices (203, 204, and 205) are stored in queues based upon the assigned priority. A priority scheduler (202) assigns priorities on a dynamic (or ad-hoc) basis such that all data delivery requests are met using available bandwidth.

In accordance with at least one embodiment of the invention, the priority scheduler receives information about historical data delivery requests and real-time requests in order to calculate the amount of delay and timing (speed) that will be offered to the users. It will be appreciated that this ensures that each user QoE (quality of experience) is maximized and the mobile network operator is able to efficiently utilize available bandwidth during both peak and off-peak times. In the present non-limiting example, priorities (p1, p2, . . . pn) are set based upon the user's required delivery time. Requests for immediate delivery will receive a higher priority (in the present example, such higher priority is set to 1) than a request for delayed delivery. Immediate demand requests will thereby be placed in a queue with priority of 1. As the deadline for each delayed request is approached, it is moved into the next priority queue. As queues are emptied of their data requests, subsequent data requests are placed in the next higher priority queue. When a delayed delivery request deadline is imminent, it is placed in a queue with a higher priority than the immediate demand request. In this way, all the data requests are delivered by the promised deadline.

Figure 3:
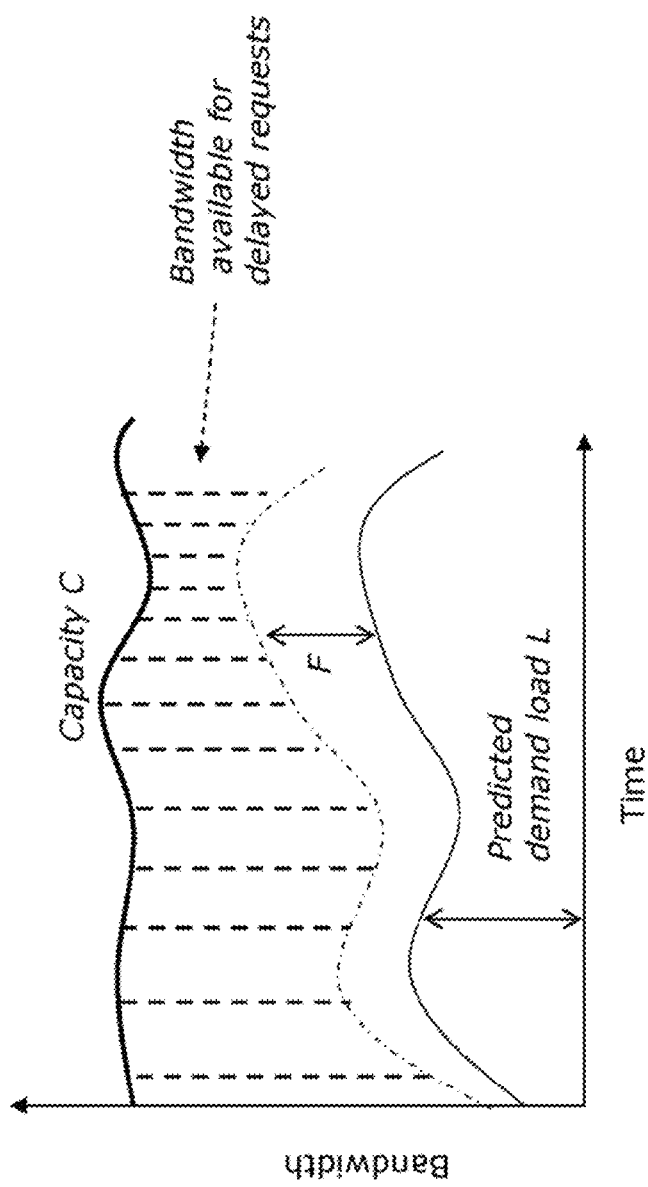
FIG. 3 illustrates an example embodiment.

Now referring to FIG. 3, a graph of an illustrative example in accordance with at least one embodiment of the invention is shown. In this non-limiting example, the vertical axis represents bandwidth, wherein C (capacity) represents the total bandwidth available to satisfy current 3G mobile device data demands. The horizontal axis represents time.

In accordance with the present example in accordance with at least one embodiment of the invention, inasmuch as capacity (C) in a network can vary, predictions are made over time as to what the load on the bandwidth will be in the future. Such predictions include the actual load, and (in a manner now to be appreciated) an added margin of error. (Generally, margin of error can be determined by available capacity, and predicted and actual load. C minus F [a quantity defined below] determines the available capacity for delayed requests, and F can be adjusted to satisfy the accepted delayed requests in lieu of margin of error.) In this non-limiting example, the estimation of the load and the current capacity make up a floating bi-level bandwidth that allows delayed requests to be satisfied. As such, the fluctuating capacity and the predicted load, along with load actually used, are employed in assigning priority for the previously accepted delayed delivery requests and what priority will assigned to the incoming requests for delayed delivery.

In the present non-limiting example, in accordance with at least one embodiment of the invention, F represents a dynamically adjusted tolerance related to bandwidth for accommodating delayed delivery requests. If there is a very small F, there is less chance of meeting a promised deadline for the delayed delivery requests while if there is a larger F, there is a better chance that deadlines for the delayed delivery requests will be met. F is adjusted dynamically such that when deadlines are being met, F may be decreased. Likewise, when deadlines are not being met, F may be increased.

In accordance with at least one embodiment of the invention, a process as follows may be used to dynamically increase or decrease F. Let C be the current bandwidth capacity for the mobile network operator, and let F be the dynamically adjusted tolerance for the total required data delivery requests. For each new request for delayed delivery, determine a deadline Di such that delayed delivery requests already accepted and the new delayed delivery request will meet their deadlines using the bandwidth comprising C-F. Let p represent a value by which F is increased; a violation count is increased when each time a deadline for a delivery request is not met. Let q represent a value by which F is decreased; a satisfaction count is increased when each time a deadline for a delivery request is met. Then, when the number of delayed data requests with priority higher than 1 exceeds T1, increase F by p and set the violation count back to 0. Else, if the number of delayed data requests meeting deadlines exceeds T2, then increase F by q and set the satisfaction count back to 0.

Referring back to FIG. 3, embodiments in accordance with the invention provide that when the violation count increases, the offers for delayed delivery of data increase and the time to deliver increases. In this way, as fluctuations in demand, delayed delivery requests, on-demand requests and bandwidth capacity are experienced, F may be adjusted to ensure that all the delivery deadlines are met and the bandwidth is used most efficiently to meet the delivery deadlines.

Figure 4:
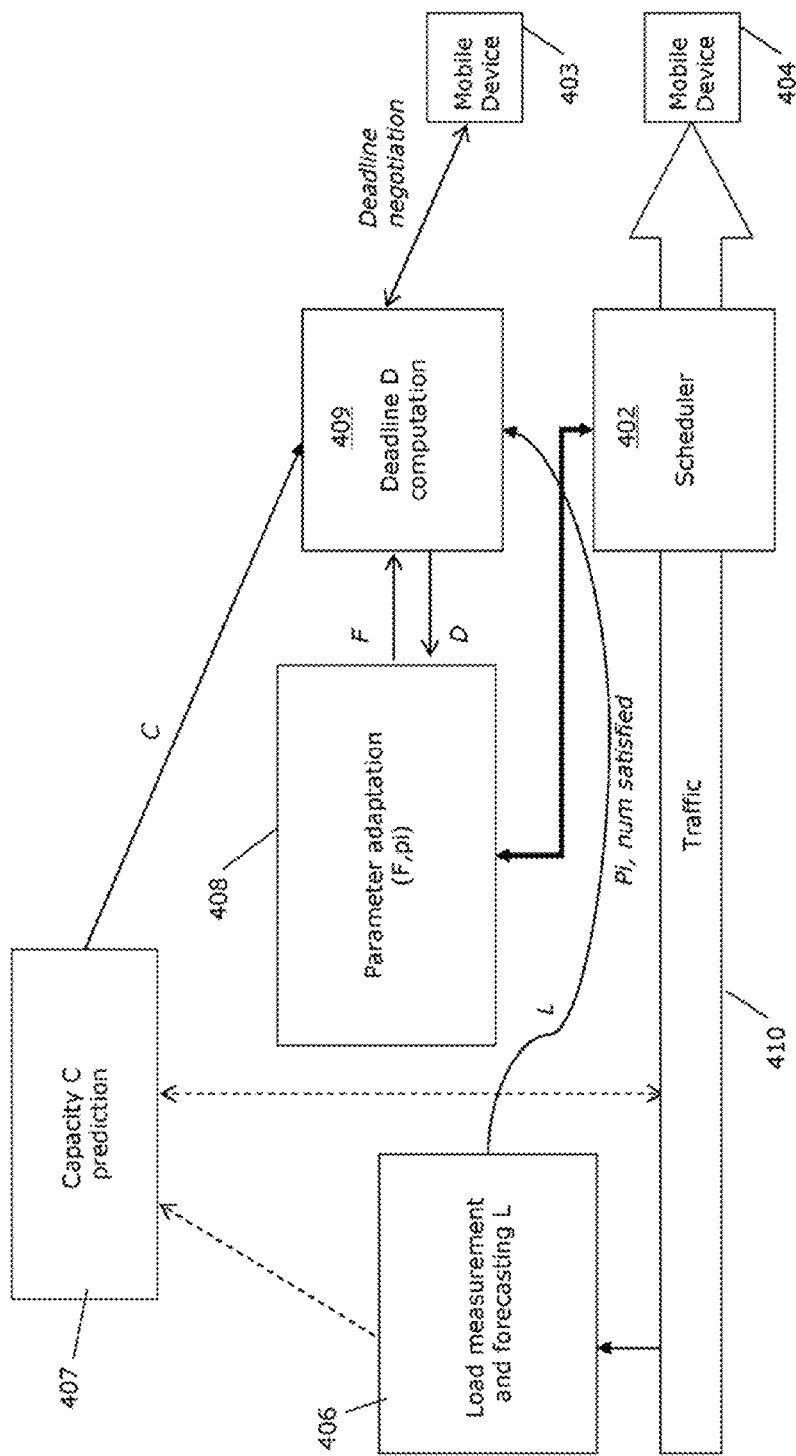
FIG. 4 illustrates a block diagram of an example embodiment.

Referring now to FIG. 4, an example of a process, in accordance with at least one embodiment of the invention, is illustrated. In this non-limiting example, mobile devices 403 and 404 make requests for data delivery, which may be for immediate or delayed delivery. Current bandwidth usage by the data flows comprising all the traffic 410 is measured at 406, and serves as the basis for a prediction 407 of capacity C. Actual load is represented by L, and the gap between a prediction for a given timepoint and the load L at that timepoint is denoted by F. As discussed previously, the load prediction and current load L thereby result in a floating bi-level bandwidth that allows delayed requests to be satisfied.

In accordance with at least one embodiment of the invention, parameter adaptation at 408 utilizes the fluctuating capacity and the predicted load, as well as what is actually used by the data demand load, to assign priority (Pi) for the previously accepted delayed delivery requests as well as for the incoming requests for delayed delivery. In this non-limiting example, F is the tolerance (or gap) with respect to the fluctuation that is needed to accommodate the delayed delivery requests. F is dynamically increased and decreased based upon the deadline violations and deadlines satisfied. As the number of deadlines violated increases, F is increased and as the number of deadlines are satisfied, F is decreased.

In accordance with at least one embodiment of the invention, at 409 deadline D is computed based upon the number of delayed data delivery requests. The scheduler 402 then assigns priorities to each data delivery request and places each request into a priority queue. As the deadline Di for each delayed delivery request approaches, the requests are moved into higher priority queues. In order to meet all of the deadline requests including on-demand requests, offers for delayed delivery requests are increased as well as the time allowed to meet the requests.

Some embodiments provide that some data delivery offers may include guarantees that if the delayed delivery is not accomplished by the promised deadline, the delivery is free. Other embodiments provide that a user may be offered temporary discounts or reprieves from their current subscription data caps if they select a delayed delivery option. Embodiments provide that such incentives may encourage mobile device users to shift their data demand from peak usage time to off-peak times. Some embodiments provide that as the demand for actual bandwidth increases, the number of offers for delayed data delivery, the time permitted to satisfy the data delivery requests and the discounted offers may all be increased in combination or individually to collect the desired number of delayed requests to spread the bandwidth usage out over the time desired. Still other embodiments provide that users may be offered the opportunity to pay additional money to receive faster delivery of a specific data object.

Some embodiments provide that offering users delays in upload time may also be used to accomplish spreading of bandwidth usage. In one non-limiting example, after choosing to post a data object to a social network, the user is prompted with an option to post the data object on a delayed basis. Thus, embodiments may applied for both download requests and upload requests (referred to herein interchangeably as "transmission requests").

Embodiments provide that the mobile network operator (MNO) is the critical point for placement of embodiments. Embodiments provide that an over-the-top provider (OTT) does not have information about the actual bandwidth capacity so the OTT must rely upon an MNO to learn the available bandwidth at any given time. Without this information, an OTT will not be able to provide mobile users with efficient bandwidth usage and the QoE will decrease during peak data usage times because demands will exceed capacity and data will not be delivered without unintended delays or before promised deadlines. Importantly, decreasing costs of delivery of OTT data benefits both the OTT and the MNO because QoE will increase and confidence in the services of provided by the OTT and MNO will likewise increase encouraging more adoption of 3G spectrum. The information about actual bandwidth capacity and past and present data loads is controlled by the MNO. As discussed above, embodiments provide that such information may be needed for calculating desired data delivery delays in order to efficiently use the spectrum (which may be a 3G or 4G spectrum) and meet all of the data delivery deadlines. Thus, it will be appreciated that encouraging the efficient use of the spectrum benefits both over-top-providers and mobile network operators and users of mobile devices. In this way, embodiments described herein benefit all.

Figure 5:
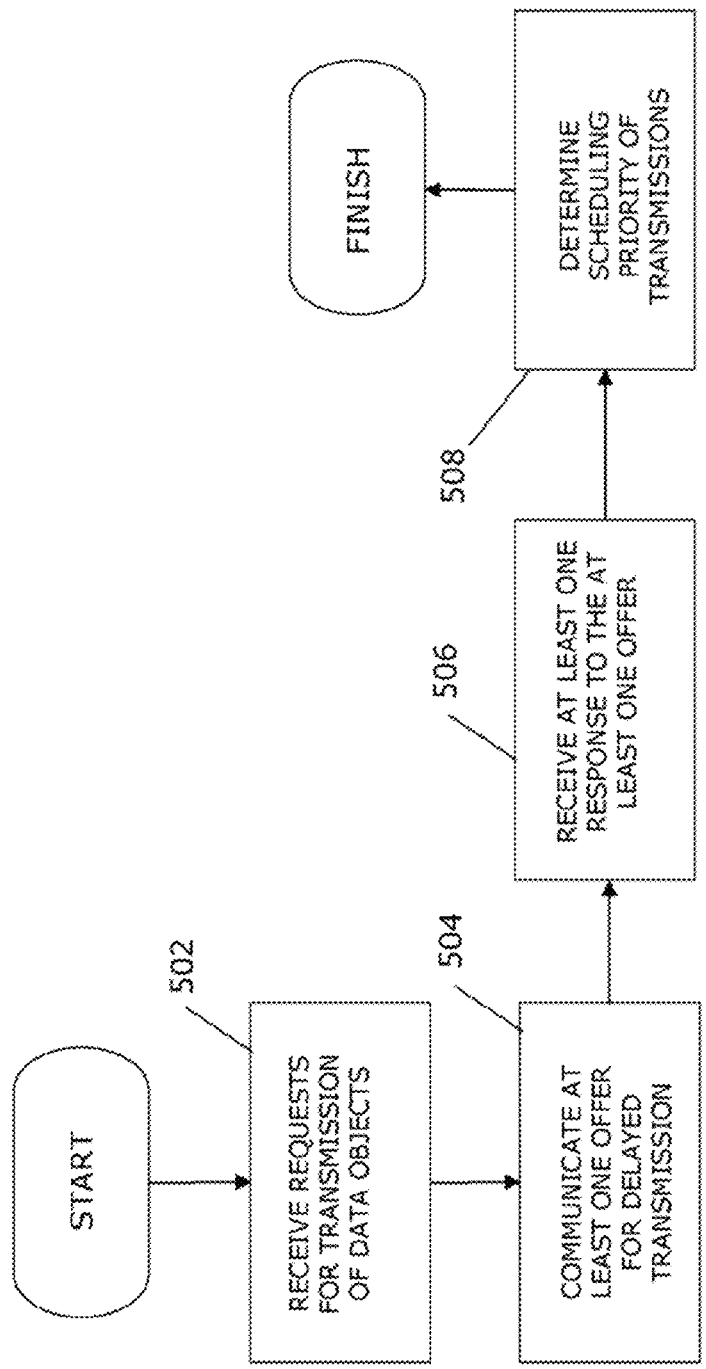
FIG. 5 sets forth a process more generally for effecting delayed delivery of data

FIG. 5 sets forth a process more generally for effecting delayed delivery of data, in accordance with at least one embodiment of the invention. It should be appreciated that a process such as that broadly illustrated in FIG. 5 can be carried out on essentially any suitable computer system or set of computer systems, which may, by way of an illustrative and non-restrictive example, include a system such as that indicated at 12' in FIG. 6. In accordance with an example embodiment, most if not all of the process steps discussed with respect to FIG. 5 can be performed by way of a processing unit or units and system memory such as those indicated, respectively, at 16' and 28' in FIG. 6.

As shown in FIG. 5, in accordance with at least one embodiment of the invention, there are received, at a scheduler, from a plurality of mobile computing devices, a plurality of requests for transmission of data objects (502). Responsive to the requests, communication is made to at least one of the devices at least one offer for a delayed transmission deadline of at least one data object (504). There is received, at the scheduler, at least one response to the at least one offer (506), and there is determined a scheduling priority of transmissions based on the at least one response (508).

Figure 6:
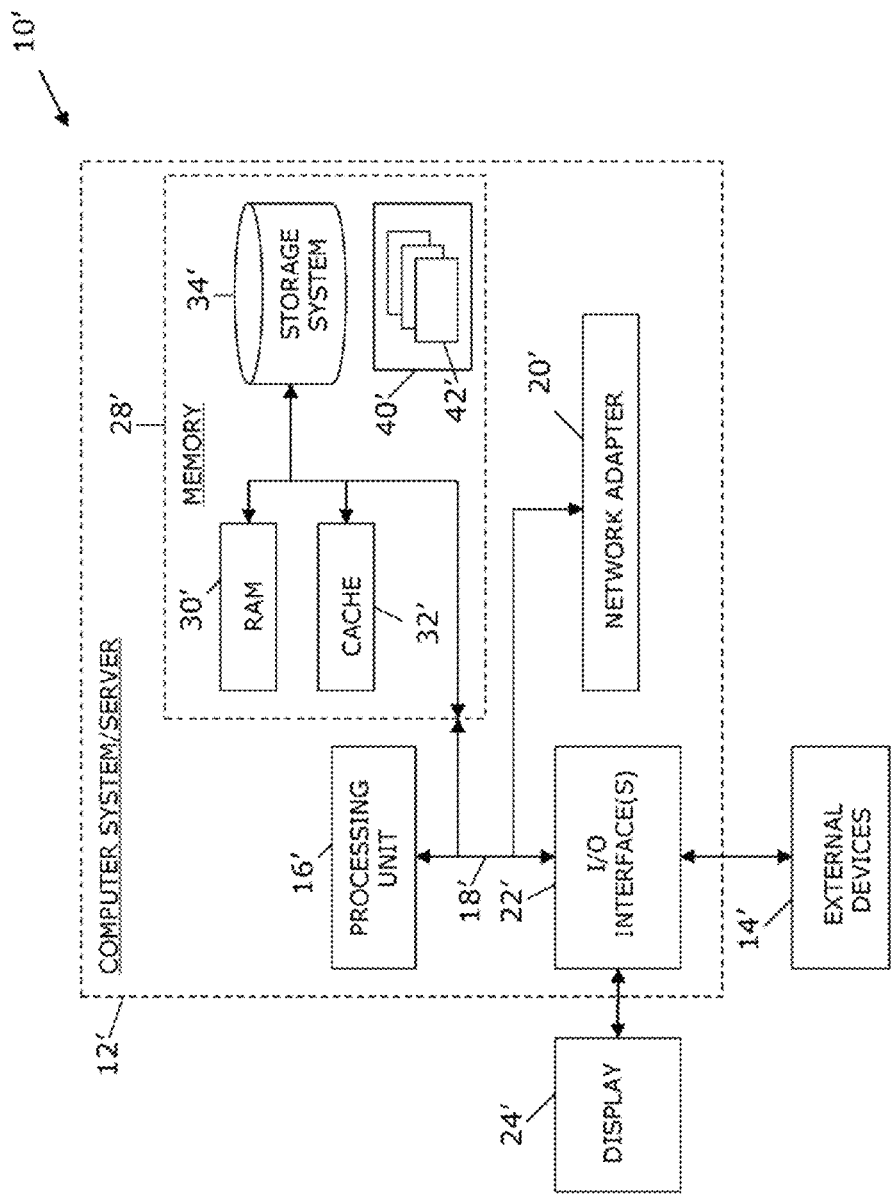
FIG. 6 illustrates a computer system.

Referring now to FIG. 6, a schematic of an example of a cloud computing node is shown. Cloud computing node 10' is only one example of a suitable cloud computing node and is not intended to suggest any limitation as to the scope of use or functionality of embodiments of the invention provided herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/ server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be provided in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12' in cloud computing node 10 is shown in the form of a general-purpose computing device. The components of computer system/ server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/ server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are provided herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture. Such an article of manufacture can include instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and provided in order to explain principles and practical application, and to enable others of ordinary skill in the art to understand the disclosure.

Although illustrative embodiments of the invention have been provided herein with reference to the accompanying drawings, it is to be understood that the embodiments of the invention are not limited to those precise embodiments, and that various other changes and modifications may be affected therein by one skilled in the art without departing from the scope or spirit of the disclosure.

The invention claimed is:

1. A method of effecting delayed delivery of data, said method comprising the steps of:
  utilizing a processor to execute computer code configured to perform the steps of:
  receiving at a scheduler, from a plurality of mobile computing devices, a plurality of requests for transmission of data objects;
  responsive to the requests, communicating to at least one of said mobile computing devices at least one offer for a delayed transmission deadline of at least one data object;
  receiving, from the mobile computing device, at least one response selecting at least one offer for delayed transmission;
  determining a scheduling priority of transmissions based on the at least one response, said determining comprising assigning a lower priority to a request for immediate transmission than to a scheduled transmission time for which a deadline has already been reached;
  wherein the request for immediate transmission is received from another mobile computing device other than the mobile computing device; and
  transmitting, based on the scheduling priority, the requested data objects;
  wherein the at least one response is based on a user selection on the mobile computing device.

2. The method of claim 1, wherein said determining comprises altering a scheduled transmission time ad-hoc to ensure that at least one delayed transmission deadline is met.

3. The method of claim 2, wherein:
  said receiving at least one response to the at least one offer comprises receiving positive responses to offers for a delayed transmission deadline; and
  said altering comprises increasing a scheduled transmission time in response to a predetermined rate of accumulation of positive responses to offers.

4. The method of claim 2, wherein said altering comprises altering a scheduled transmission time in response to a fluctuation in transmission network capacity.

5. The method of claim 1, wherein the at least one offer includes a guarantee of transmission free of monetary charge if the delayed transmission deadline is not met.

6. The method of claim 1, wherein the at least one offer includes an offer of immediate transmission of the at least one data object if a monetary charge above a predetermined threshold is involved.

7. The method of claim 1, wherein the at least one offer includes an offer of transmission of the at least one data object at a reduced transmission rate and at a discounted charge.

8. The method of claim 1, wherein said determining comprises allocating at least one increased priority in response to approach of a delayed transmission deadline.

9. An apparatus comprising:

at least one processor; and a computer readable storage medium having computer readable program code embodied therewith and executable by the at least one processor, the computer readable program code comprising:

computer readable program code configured to receive at a scheduler, from a plurality of mobile computing devices, a plurality of requests for transmission of data objects;

computer readable program code configured to communicate to at least one of the mobile computing devices, responsive to the requests, at least one offer for a delayed transmission deadline of at least one data object;

computer readable program code configured to receive, from the mobile computing device, at least one response selecting at least one offer for delayed transmission;

computer readable program code configured to determine a scheduling priority of transmissions based on the at least one response, said determining comprising assigning a lower priority to a request for immediate transmission than to a scheduled transmission time for which a deadline has already been reached;

wherein the request for immediate transmission is received from another mobile computing device other than the mobile computing device; and transmitting, based on the scheduling priority, the requested data objects;

wherein the at least one response is based on user selection on said mobile computing device.

10. A computer program product comprising:

a non-transitory computer readable storage medium having computer readable program code embodied therewith, the computer readable program code comprising:

computer readable program code configured to receive at a scheduler, from a plurality of mobile computing devices, a plurality of requests for transmission of data objects;

computer readable program code configured to communicate to at least one of the mobile computing devices, responsive to the requests, at least one offer for a delayed transmission deadline of at least one data object;

computer readable program code configured to receive, from the mobile computing device, at least one response selecting at least one offer for delayed transmission;

computer readable program code configured to determine a scheduling priority of transmissions based on the at least one response, said determining comprising assigning a lower priority to a request for immediate transmission than to a scheduled transmission time for which a deadline has already been reached;

wherein the request for immediate transmission is received from another mobile computing device other than other than the mobile computing device; and transmitting, based on the scheduling priority, the requested data objects;

wherein the at least one response is based on user selection on said mobile computing device.

11. The computer program product of claim 10, wherein said computer readable program code is configured to alter a scheduled transmission time ad-hoc to ensure that at least one delayed transmission deadline is met.

12. The computer program product of claim 11, wherein said computer readable program code is configured to increase a delayed transmission time in response to a predetermined rate of accumulation of received positive responses to offers for delayed transmission time.

13. The computer program product of claim 11, wherein said computer readable program code is configured to alter a scheduled transmission time in response to a fluctuation in transmission network capacity.

14. The computer program product of claim 10, wherein the at least one offer includes a guarantee of transmission free of monetary charge if the delayed transmission deadline is not met.

15. The computer program product of claim 10, wherein the at least one offer includes an offer of immediate transmission of the at least one data object if a monetary charge above a predetermined threshold is involved.

16. The computer program product of claim 10, wherein the at least one offer includes an offer of transmission of the at least one data object at a reduced transmission rate and at a discounted charge.

17. The computer program product of claim 10, wherein said computer readable program code is configured to allocate at least one increased priority in response to approach of a delayed transmission deadline.

* * * * *